(12) United States Patent
Wood

(10) Patent No.: US 8,239,537 B2
(45) Date of Patent: Aug. 7, 2012

(54) METHOD OF THROTTLING UNWANTED NETWORK TRAFFIC ON A SERVER

(75) Inventor: Stephen Wood, Whitehouse Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 371 days.

(21) Appl. No.: 12/006,294

(22) Filed: Jan. 2, 2008

(65) Prior Publication Data

US 2009/0172162 A1 Jul. 2, 2009

(51) Int. Cl.
*G06F 15/173* (2006.01)
(52) U.S. Cl. .................. 709/226; 709/223; 709/225
(58) Field of Classification Search .......... 709/203–207, 709/223–229
See application file for complete search history.

(56) References Cited

U.S. PATENT DOCUMENTS

| | | | |
|---|---|---|---|
| 5,999,967 A | 12/1999 | Sundsted | |
| 6,249,805 B1 | 6/2001 | Fleming, III | |
| 6,421,709 B1 | 7/2002 | McCormick et al. | |
| 6,650,890 B1 | 11/2003 | Irlam et al. | |
| 6,732,157 B1 | 5/2004 | Gordon et al. | |
| 6,816,456 B1 * | 11/2004 | Tse-Au | 370/230.1 |
| 6,823,385 B2 * | 11/2004 | McKinnon et al. | 709/226 |
| 7,072,942 B1 | 7/2006 | Maller | |
| 7,155,608 B1 | 12/2006 | Malik et al. | |
| 7,206,814 B2 | 4/2007 | Kirsch | |
| 7,219,148 B2 | 5/2007 | Rounthwaite et al. | |
| 7,366,170 B2 * | 4/2008 | Umesawa et al. | 370/389 |
| 2002/0124103 A1 * | 9/2002 | Maruyama et al. | 709/234 |
| 2005/0193072 A1 * | 9/2005 | Chant et al. | 709/206 |
| 2005/0198159 A1 * | 9/2005 | Kirsch | 709/206 |
| 2006/0224673 A1 * | 10/2006 | Stern et al. | 709/206 |
| 2007/0220125 A1 * | 9/2007 | Li et al. | 709/223 |
| 2008/0140826 A1 * | 6/2008 | McColgan et al. | 709/224 |
| 2009/0070454 A1 * | 3/2009 | McKinnon et al. | 709/224 |
| 2010/0325272 A1 * | 12/2010 | Lloyd et al. | 709/224 |

* cited by examiner

*Primary Examiner* — Joshua Joo

(57) ABSTRACT

The invention provides a method and device for limiting unwanted network traffic, including unwanted emails. The method proceeds by assigning at least one network address to a category of network addresses based on a level of trust of the network address. Connection resources are allocated to the category. When a connection is received from a network address to which the category has been assigned, a portion of the allocated resources in the category are provided to the network address.

10 Claims, 3 Drawing Sheets

METHOD OF THROTTLING UNWANTED NETWORK TRAFFIC ON A SERVER

BACKGROUND OF THE INVENTION

Each day millions of unique, anonymous, untrusted SMTP mail systems connect or attempt to connect to large Internet Service Providers (ISPs) to transmit email. In general, the ISPs accept the connections and deliver the email, even though a large proportion of such email is spam and/or contains viruses. Some ISPs receive 90% spam. Large ISPs may receive 500 million spam messages each day, transmitted from tens of millions of unique IP addresses, many of which have never before connected to the ISP. The mail systems misrepresent themselves during session establishment and a growing number of them provide untruthful responses to ISP queries.

As a result of being unsure of the sender's identity, the systems' trustworthiness, the lack of reputation, the volume and breadth of attacks, and the ever increasing difficulty of ascertaining whether a message is spam, ISPs have had a hard time improving the effectiveness of their current spam blocking and filtering processes. As a consequence, spam is increasingly being delivered to the ISP members' mailboxes and has significantly and adversely affected their experience with using email. In addition, from an ISP's perspective, it has greatly affected the cost of providing service.

Spammers need targets for their spam, resources to deliver it, and a consumer market that would consider purchasing their products. This new process for preventing or mitigating attacks focuses on the spammers' need for "resources to deliver spam". Because of the current blocking and filtering efforts, spammers now require a considerable amount of resources to deliver their spam. As a result, spammers have compromised vast numbers of PCs to use as their resources to deliver spam. So the goal is to control the amount of traffic that comes from these millions of compromised PCs, many of which have never connected to the ISP, do not have a reputation for sending spam, misrepresent themselves, cannot be trusted, and send spam that is not caught by spam filters.

Currently, ISPs use an integrated blocking and filtering process to prevent or mitigate spam attacks. ISPs first focus their efforts on either obtaining spam filtering rules from a vendor or developing their own from analysis of spam messages. Secondly, ISPs either obtain a spam IP blacklist from a vendor, or they compile their own by analyzing the verdict results, arriving at a reputation for each mail system and determining whether it should be added to their block list.

More specifically, the operation of the blocking and filtering process is as follows: When an originating mail system attempts to transmit email to a destination mail system, the originating IP address is checked against a blacklist. If the originating IP address is on the blacklist, the connection and associated messages are rejected. An error is returned on rejected connections and, in many cases, a non-delivery notice is sent back to the originator of a rejected message. If the connection is accepted, the message(s) is (are) passed to a filtering process to determine if it is spam. If the message is determined to be spam, then the message is either quarantined or deleted. If the message is not determined to be spam, the message is sent to the recipient's Inbox.

A problem with such prior art solutions is that spammers can easily send spam that gets past the blacklists and filters. They send spam from a vast number of different IP addresses that have no reputation or not a bad reputation. They modify their spam messages as often as they need in order to get a sufficient amount of spam through the filters. They test their spam messages prior to initiating an attack to insure it is sufficient. As a result, ISPs are constantly updating their blacklists and their filtering rules after the fact, in the hope that it may mitigate the next attack.

The effectiveness of the current filtering process is limited because it is very hard to mitigate attacks by simply filtering spam messages post-emptive. Spammers easily change or randomize the content of the spam messages to bypass even the best filters. Additionally, spammers can execute test spam attacks to determine whether their spam messages for this specific spam attack will get past the filtering defenses. Even if a high percentage of the spam gets filtered out, the spammers will increase their volume until they get a sufficient amount of spam through the filters.

The ISP will then respond by attempting to block more spam, and this escalation can consume more ISP resources. This may lead to the ISP continuing to add ever more resources to handle the increase in connections and message traffic, ultimately running out of resources, with the result that the spam attacks can cause Denial of Service (DoS) conditions.

SUMMARY OF THE INVENTION

The invention provides a method and device for limiting unwanted network traffic, including unwanted emails. The method proceeds by assigning at least one network address to a category of network addresses based on a level of trust of the network address. Connection resources are allocated to the category. When a connection is received from a network address which has been assigned the category, a portion of the allocated resources in the category are provided to the network address.

The method of the invention may be performed on an SMTP server. In such an embodiment, the method of the invention is used to limit unwanted email such as spam. At least one network address may be an IP address on the Internet, and the category assignment may be unknown to an initiator of the connection.

Further, the allocated connection resources may be allocated based on the number of network addresses assigned to the category. Thus, if the category contains relatively few network addresses, then connection resources will be less than if the category has more network addresses.

Four main categories are contemplated for use with the invention. In a first category, the 'friendly' category, as well as a second category, the 'uncertain' category, the connection resources are sufficient to support all received connections. However, in the 'friendly' category, the connection resources are sufficient to also support a surge in said received connections, whereas the 'uncertain' category is typically maintained such that connection resources will not be enough to handle a surge but sufficient to handle regular needs.

In a third category, the 'potentially dangerous' category, connection resources are typically maxed out. Any surge in received connections causes connection resources to each connection to be decreased. In a fourth category, the 'unfriendly' category, connection attempts are routinely dropped and/or an error is returned. The allocated resources in this category are insufficient to allow a connection to be maintained.

The invention also contemplates a device having the means to carry out the above method.

DETAILED DESCRIPTION

In broad terms, the invention disclosed is a method of limiting unwanted network traffic in an online environment such as the Internet. This new process for preventing or mitigating unwanted network traffic, including spam, DoS attacks, and the like proceeds by preemptively assigning individual and/or ranges of network addresses to categories. Each category is given an appropriate amount of connection resources, depending on the level of trust for the network addresses within each category. In this matter, spammers and others in the same category will be competing for the same resources, preferably, without knowing in which category they have been placed. Thus, senders of network traffic cannot tell if the ISP is throttling their network traffic or is running out of resources, and will likely find a different target for the unwanted data or will simply only be able to send less unwanted data.

If one spammer significantly reduces the amount of spam he sends, in an attempt to get around the category restrictions, there is still a high probability that another spammer will use up the available resources, and, as a result, the net amount of unwanted traffic, including spam, will be decreased. The invention further serves to reduce the effectiveness of a DoS (Denial of Service) attack or distributed DoS attack, wherein an excessive amount of network traffic is sent to a server in an attempt to disable the server. In a distributed attack, the data are received from many sources. In such a case, the data usually will come from sources which have less trust, and their connection requests will be assigned to categories which are given few or just enough resources. Thus, the surge in network traffic from such sources will be denied because the connection resources in that category will be maxed out. However, while this will limit traffic in the category, traffic received from senders in other categories will not be affected.

The method of the invention significantly reduces the amount of spam delivered to an ISP member's mailboxes, as well as network traffic from undesirable sources. From the perspective of the ISP, the cost of providing service to users is reduced.

In the prior art method, when an originating node or server attempts to transmit data to a recipient, the recipient spawns an appropriate process to receive the connection. For example, when a mail system attempts to transmit email to a destination mail system, an attempt is made to connect to a specific IP address and port (i.e., port 25). The destination mail system listens on this port and spawns an appropriate process to handle the incoming request. In the present invention, instead of simply spawning a process to handle the request, various actions are taken to determine which process should be spawned and what resources should be allocated to the process and to the totality of the processes within the category.

Figure 1:
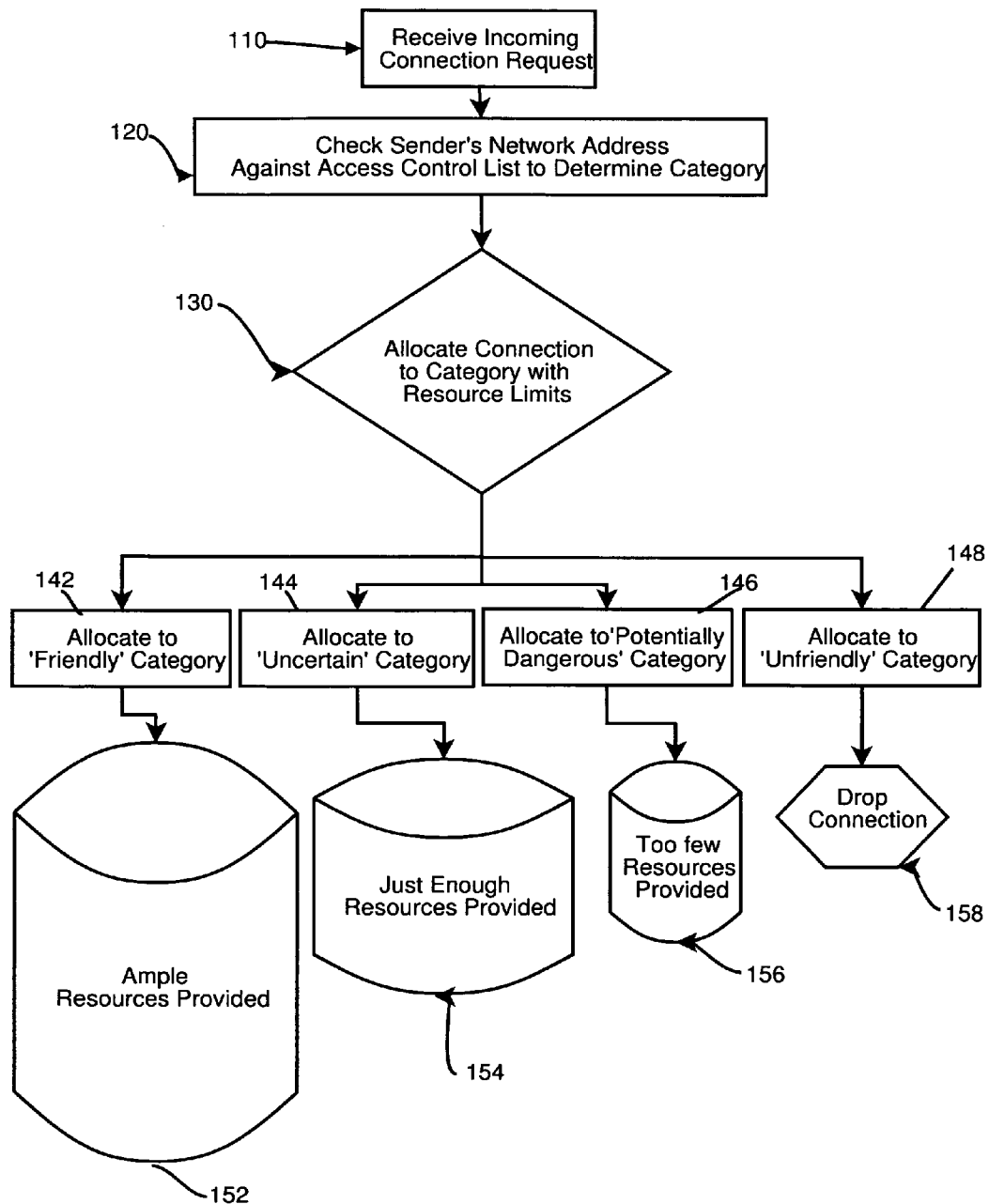
FIG. 1 is a flow chart showing a method of carrying out an embodiment of the invention.

FIG. 1 is a flow chart showing a method of carrying out an embodiment of the invention. In step 110, an incoming connection is received. This incoming connection request may be made from any point on the network. For example, if the invention is being carried out on a mail server, then the incoming connection request will typically be received on port 25 of an SMTP server from a mail server located somewhere on the network. The sending mail server will be associated with an IP address and may send mail through one or more nodes on the network. Each node is also associated with a network address.

In step 120, the network address of the sender is taken and compared against a preprogrammed access control list. Such an access control list is a table or database comprising network addresses classified by category. Before continuing the description of FIG. 1, it is necessary to draw the reader's attention to FIG. 2.

Figure 2:
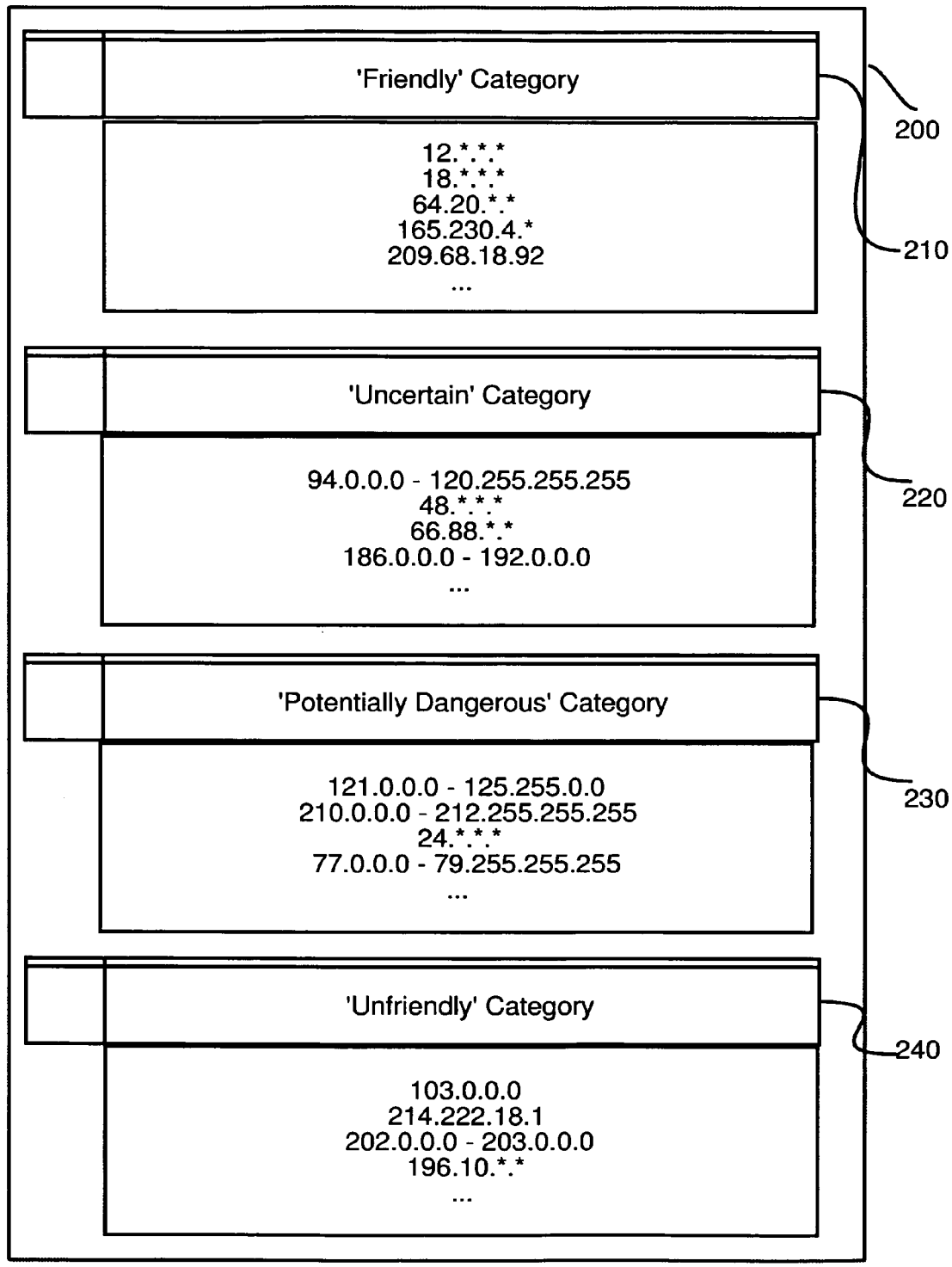
FIG. 2 is a diagram of an exemplary access control list as used in an embodiment of the invention.

FIG. 2 is a diagram of an exemplary access control list as used in an embodiment of the invention. Table 200 comprises one or more entries, or range of entries, wherein each entry or range of an entry is associated with a category. Typically, table 200 is a lookup table wherein a value is sent or queried and a category is returned. The categories used to carry out the invention may have any name or not be named at all; however, each category comprises entries based on a level of trust. Trust is defined as a relative or absolute amount that each host on a network associated with each network address entered in the table 200 is trusted to send only desired communications. An entry may be a single network address or a range of network addresses. If a query comprises a network address associated with a category, or falls within a range of network addresses associated with a category, such a category will be returned as a result of the query and appropriate action can be taken.

'Friendly' Category 210 typically comprises hosts and nodes on the network, such as mail systems on the Internet which have been previously determined to be trustworthy systems. Such data are garnered from at least historical data about systems which transmit very little or no unwanted data such as spam. These systems are "trusted" to maintain this level. It is desired that there be a sufficient amount of resources to handle all connection requests from such systems and allow transfers of data to and from such systems to take place without hindrance. For example, resources used to handle connections with systems in the 'Friendly' Category 210 will typically run at about 97% idle.

In the 'Friendly' Category 210, ranges of network addresses in the form of IP addresses have been placed. This includes, for example, 12.*.*.* which maps to all addresses associated with Bell Labs. Or, for example, 209.68.18.92, a specific IP address may be placed in the 'Friendly' Category 210. Such addresses are by way of example and are not meant to limit the invention in any way. It should be understood that many more IP addresses and ranges of IP addresses may be used.

In the 'Uncertain' Category 220, there are network addresses of systems lacking historical data (new IP addresses), that send some spam, that are small, or are untrusted. In this category, a server would likely be configured to support a sufficient number of connection resources to handle the current traffic from these systems. A goal for this category may be never to exhaust connection resources (e.g., run at 75% idle). These systems will mainly include small ISPs, hosting services, small businesses, and spamming hosts.

In the 'Potentially Dangerous' Category 230, there are placed network addresses associated with servers which are not under the control of proper administrators, have the potential of sending large amounts of spam, can potentially execute DoS attacks, and so forth. This might also include mail systems that originate from PCs connected to cable, DSL, dialup or wireless networks. Network addresses falling within this category might be given an insufficient number of connection resources (such as SMTP processes) to handle the current traffic from these systems. A goal might be to continuously assign ever more network addresses to this category, or reduce available resources in such a way that this bucket will always run out of connection resources (e.g., run 0% idle). Data from available blacklists can be used to find network addresses to assign to this category. On the Internet, a "Temporary busy 450 error" will likely be returned when resources are unavailable. The amount of resources required to support connections from these "Potentially Dangerous" systems should be fairly small and will reduce resources needed by an ISP.

Referring again to FIG. 1, in step 130, the incoming connection is associated with a category based on data from the access control list 200. An entire category, such as a 'Friendly Category' 210, will receive a set amount of resources. Further, each connection within the category will receive a set amount of resources, though the maximum amount of resources used by all the connections in a category cannot exceed the amount of resources assigned to the category.

In alternative embodiments of the invention, the incoming connection is assigned to a category based on one or more of the network addresses between the sender and recipient. For example, if the connection comes from an unknown or unclassified network address, but the connection travels through a server known for sending out spam, it may be desirable to categorize the connection based on such a server between the sender and recipient. This information can be discovered by reading message headers, using the 'trace route' command, or other means.

In steps 142, 144, 146, and 148, the connection is allocated to an appropriate category with predefined connection limits for the entire category, as well as for each individual connection. Category allocations in steps 142, 144, 146, and 148 are by way of example and are not meant to limit the scope of the invention. For example, in step 142 connections originating from network addresses associated with the 'Friendly' Category 210 are allocated. In this category ample resources 152 are provided as discussed above. Thus, for example, in step 142 maximal resources available on the server will be provided to incoming connections, and the portion of these resources available to each connection will be at least as much as necessary. For instance, if 100 SMTP connections are made every minute from mail servers in this category, the resources available may support 35,000 SMTP connections every minute to allow all mail from trusted servers to enter without delay.

In step 144, connections originating from network addresses within the 'Uncertain' Category 220 are allocated, by way of example. Thus, just enough resources are provided to handle the network traffic in this category. When apportioned among network connections, each such connection will have enough resources 154 to function. Thus, for example, if 1000 SMTP connections are made every minute from hosts associated with network addresses in this category, a mail server may be configured to handle 1,100 SMTP connections per minute. Thus, all connections will be allowed in typical circumstances, but requests to send mail to the server will begin to slow down, or be disallowed, if traffic increases and the share of resources 152 available are not enough to allow a sufficient portion of the resources to a network connection. In such a case, the portion of the resources allocated may only be sufficient to send a message indicating that a given connection request cannot be honored at this time (such as by sending an a 450 error message indicating temporary unavailability or a 550 error message indicating a permanent error). Additionally, connections might be limited, let us say, to one or two connections allowed per time unit to a network address.

In step 146, connections originating from network addresses within the 'Potentially Dangerous' Category 230 are allocated. Thus, less than the total amount of resources needed are provided and all network traffic in this category cannot be handled. This is depicted by resources 156. The resources 156 allocated to this category may be limited in terms of the number of simultaneous connections allowed from all systems assigned to this category. The more persistent these systems are, the greater the chance that they will block themselves, or more importantly, block spam and unwanted network traffic from other systems which are also attempting to connect. From the perspective of a spammer or sender of unwanted network traffic, such traffic will go through from time to time, but usually their network address will be temporary blocked (and the sender will receive a 450 error message indicative of a temporary error). The amount of resources apportioned to such blocked connections will be sufficient only to notify the sender of the situation, if possible. Some of the senders may believe that this ISP has run out of resources and will reduce the amount of connections or network traffic or send to other ISPs instead. Others will try harder or may use different network addresses to send from, but this will result in more failures to send data, as well as block others from sending unwanted network traffic. In a sense, the spammers and others are blocking one another. The resources 156 allocated to this category may also be reduced by setting strict limits on the total number of simultaneous connections a single network address could initiate and the total connections a single network address can initiate over a specific time period.

Finally, if step 148 proceeds, connections originating from the 'Unfriendly' Category 240 of network addresses are allocated. In such a case, the resources allocated in this category, or apportioned to a connection in this category, are insufficient to support the connection, and the connection is dropped in step 158.

In an embodiment of the invention, resources 152, 154, and 156, by way of example, are located on the same physical computer or share resources on a plurality of computing devices. However, in another embodiment of the invention, resources 152, 154, and/or 156 may be on a separate computer or plurality of computing devices. Still further, steps of the invention need not take place on a single computer or plurality of computing devices acting in concert, but on different computer systems. For example, steps 110, 120 and 130 may take place on a first computer or plurality of computing devices, and steps in the 140s and higher may take place on a separate computer or plurality of computing devices. Thus, in such an embodiment, the receiving of incoming connections 110 may be directed to a first computer, which also checks the sender's network address against the Access Control List to determine the category in step 120. In step 130, when the connection is allocated to a category with resource limits, the connection may be handled by a second computer if allocated to the 'Friendly' Category 142, or a third computer if allocated to the 'Uncertain' Category 144. If allocated to the 'Unfriendly' Category in such an embodiment, then no further computing resources may be used at all. Such an embodiment may be desirable in larger systems and help protect from DoS attacks, hacking, and the like, because even if a single computer is taken down, service will only become unavailable to devices connecting within the category of network addresses assigned to such a computer.

Still further, 'resources' as used in this invention may be any physical or virtual component of limited availability within a computer system or plurality of computing devices on which the invention is practiced. A 'connection resource' is any physical or virtual component of limited availability within a computer system which is used to start, allow, maintain, continue, or disconnect a connection between a computer system or plurality of computing devices on which the invention is practiced and another computer system or computing device communicating, or otherwise exchanging data, with a computer system or plurality of computing devices on which the invention is practiced.

Some resources which are contemplated for use with the invention are as follows: The list is meant to serve as examples of resources which may be used to carry out the invention and does not limit the invention. Further resources are within the scope and spirit of the invention and contemplated for use with the invention. Resources include an amount of connections allowed from a specific network address, from a specific subnet, or from a specific geographic location. Resources also include the amount of CPU time, memory, virtual memory, network throughput, and the like, allocated to each category, connection, and the like.

Figure 3:
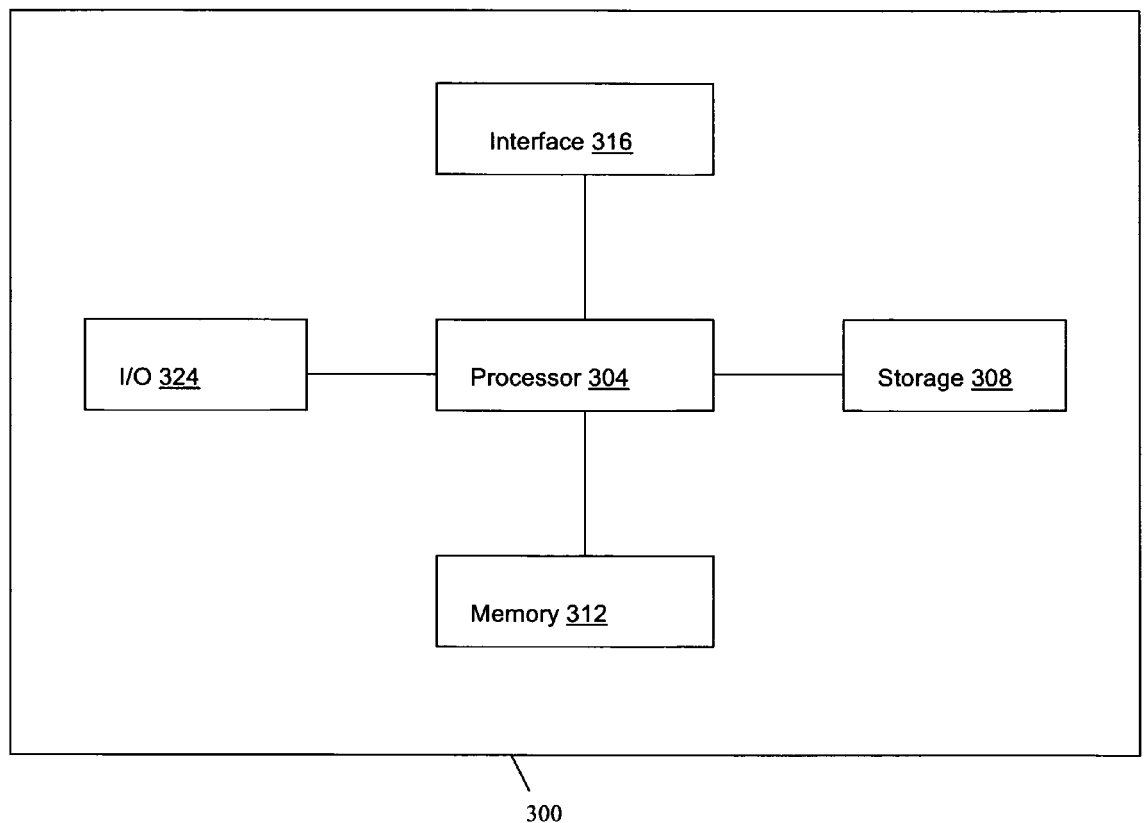
FIG. 3 shows a high level block diagram of a computer that may be used to carry out the invention.

FIG. 3 shows a high level block diagram of a computer that may be used to carry out the invention. Computer 300 contains a processor 304 which controls the overall operation of the computer by executing computer program instructions which define such operation. The computer program instructions may be stored in a storage device 308 (e.g., magnetic disk, database) and loaded into memory 312 when execution of the computer program instructions is desired. Thus, the computer operation will be defined by computer program instructions stored in memory 312 and/or storage 308 and the computer will be controlled by processor 304 executing the computer program instructions. Computer 300 also includes one or input network interfaces for communicating with other devices via a network (e.g., the Internet). Computer 300 also includes one or more output network interfaces 316 for communicating with other devices. Computer 300 also includes input/output 324 which represents devices which allow for user interaction with the computer 300 (e.g., display, keyboard, mouse, speakers, buttons, etc.). One skilled in the art will recognize that an implementation of an actual computer will contain other components as well, and that FIG. 3 is a high level representation of some of the components of such a computer for illustrative purposes. It should also be understood by one skilled in the art that the method as depicted in FIG. 1 may be implemented on a device such as is shown in FIG. 3.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

I claim:

1. A method of limiting unwanted network traffic comprising:
    assigning each of a plurality of network addresses to one of a plurality of categories of network addresses based on a level of trust specifying an amount of data each of the plurality of network addresses may transfer;
    allocating connection resources to each of the plurality of categories based on a number of network addresses assigned to each of the plurality of categories and a level of trust of network addresses assigned to each of the plurality of categories;
    receiving a request for a connection from a sender;
    associating the request with a particular one of the plurality of categories of network addresses based on a network address associated with a network path of the request, in response to a network address of an initiator of the connection being unknown; and
    providing a portion of connection resources allocated to the particular one of the plurality of categories associated with the request for the connection,
    wherein connection resources allocated to a first category of the plurality of categories are sufficient to simultaneously support all connections from network addresses associated with the first category of the plurality of categories, connection resources allocated to a second category of the plurality of categories are sufficient to simultaneously support a predetermined number of connections from network addresses associated with the second category of the plurality of categories including an increase in a number of connections associated with the second category of the plurality of categories above a number of connections sufficient for the predetermined number of connections, connection resources allocated to a third category of the plurality of categories are insufficient to simultaneously support all connections from network addresses associated with the third category of the plurality of categories, and connection resources allocated to a fourth category of the plurality of categories are insufficient to support any connection associated with the fourth category of the plurality of categories to be maintained.

2. The method of claim 1, wherein the method is performed on a simple mail transfer protocol server.

3. The method of claim 1, wherein one of the plurality of network addresses assigned to one of the plurality of categories is an internet protocol address on the internet.

4. The method of claim 1, wherein the particular one of the plurality of categories of network addresses associated with the request is unknown to the initiator of the connection.

5. The method of claim 1, further comprising:
    associating the request with the particular one of the plurality of categories of network addresses based on the network address of the initiator of the connection and in response to matching the network address of the initiator of the connection with a network address in the particular one of the plurality of categories of network addresses.

6. A device for limiting unwanted network traffic comprising:
    means for assigning each of a plurality of network addresses to one of a plurality of categories of network addresses based on a level of trust specifying an amount of data each of the plurality of network addresses may transfer;
    means for allocating connection resources to each of the plurality of categories based on a number of network addresses assigned to each of the plurality of categories and a level of trust of network addresses assigned to each of the plurality of categories;
    means for receiving a request for a connection from a sender;
    means for associating the request with a particular one of the plurality of categories of network addresses based on a network address associated with a network path of the request, in response to a network address of an initiator of the connection being unknown; and means for providing a portion of connection resources allocated to the particular one of the plurality of categories associated with the request for the connection, wherein connection resources allocated to a first category of the plurality of categories are sufficient to simultaneously support all connections from network addresses associated with the first category of the plurality of categories, connection resources allocated to a second category of the plurality of categories are sufficient to simultaneously support a predetermined number of connections from network addresses associated with the second category of the plurality of categories including an increase in a number of connections associated with the second category of the plurality of categories above a number of connections sufficient for the predetermined number of connections, connection resources allocated to a third category of the plurality of categories are insufficient to simultaneously support all connections from network addresses associated with the third category of the plurality of categories, and connection resources allocated to a fourth category of the plurality of categories are insufficient to support any connection associated with the fourth category of the plurality of categories.

7. The device of claim 6, wherein the device is a simple mail transfer protocol server.

8. The device of claim 6, wherein one of the plurality of network addresses assigned to one of the plurality of categories is an internet protocol address on the internet.

9. The device of claim 6, wherein the one of the plurality of categories of network addresses associated with the request is unknown to the initiator of the connection.

10. The device of claim 6, further comprising:

means for associating the request with the particular one of the plurality of categories of network addresses based on the network address of the initiator of the connection and in response to matching the network address of the initiator of the connection with a network address in the particular one of the plurality of categories of network addresses.

* * * * *